March 28, 1967   M. F. SMITH   3,311,085
APPARATUS FOR COATING OBJECTS
Filed May 10, 1965   9 Sheets-Sheet 4

INVENTOR
Millard F. Smith
BY
Blair & Buckles
ATTORNEYS

March 28, 1967  M. F. SMITH  3,311,085
APPARATUS FOR COATING OBJECTS
Filed May 10, 1965  9 Sheets-Sheet 7

INVENTOR.
MILLARD F. SMITH
BY Robert H. Ware
ATTORNEY

March 28, 1967 M. F. SMITH 3,311,085
APPARATUS FOR COATING OBJECTS
Filed May 10, 1965 9 Sheets-Sheet 8

MILLARD F. SMITH
INVENTOR.

BY Robert H. Ware
ATTORNEY.

United States Patent Office 3,311,085
Patented Mar. 28, 1967

3,311,085
APPARATUS FOR COATING OBJECTS
Millard F. Smith, Westport, Conn.
(P.O. Box 295, Saugatuck, Conn. 06880)
Filed May 10, 1965, Ser. No. 477,987
4 Claims. (Cl. 118—59)

This application is a continuation-in-part of my co-pending applications Ser. No. 110,581, filed May 16, 1961, Ser. No. 146,828, filed Oct. 23, 1961, both abandoned, and Ser. No. 255,601, filed Feb. 1, 1963.

This invention relates to a coating apparatus and, more particularly, to a novel apparatus for coating certain specific portions of an article using a spray of powdered and "fluidized" plastic material. The technique requires no covering of those portions to remain uncoated. It is particularly well suited to the coating of such unitary components as the rotors and stators of electric motors where the pole pieces and side wall, respectively, are normally left uncoated.

Presently-known coating techniques are of various types. Those which appear to be the most closely allied to the technique of this invention are (1) fluidized bed coating, (2) cold spray coating, and (3) liquid or semi-plastic spray coating.

In fluidized bed coating, the article to be coated is first heated above the melting point range of the plastic material being used to coat the article. It is then immersed, for a few seconds, into a fluidized bed of particles of said plastic material. Some of the particles stick to the immersed article. Upon removal, the residual heat melts and levels the adhering particles to a smooth, non-porous plastic coat. The advantages of this technique are that it eliminates the need for solvent, a thick coat can be built up by successive dips, and the coating formed is substantially uniform throughout the entire surface of the particle. The latter occurs because the scrubbing, turbulent action of the fluidized bed causes particles to reach the most recessed areas of the item being coated. There is very little material loss.

In cold spray coating, the object to be coated is similarly preheated, but here powdered plastic material is sprayed directly onto the object. Upon contacting the hot surface of the object, the plastic material melts and forms a smooth, substantially continuous coating thereon. The coating may be subsequently "polished" by a post-heating step.

A variation of this technique involves spraying the powdered coating material through a flame prior to impingement onto the surface of the object. Thus, when the powder hits, it is already molten and has a fairly high kinetic energy, increasing the adhesion and also smoothing the coating. This particular technique is attractive because it obviates the need for a fluidizing vessel and permits on-site application.

In liquid or semi-plastic spray coating, the coating material is first liquified or converted to a semi-plastic particulate state. It is then blown upon a base surface. In most instances, the formed coat is subsequently stripped off the base surface. Frequently, where the base surface is porous, a suction is provided opposite the spray nozzle to aid in uniform deposition. Although this technique has been included here, it basically is designed for film or sheet forming and has, at most, only limited utility as a coating technique, the basic reason for this being the lack of control over the application of the blown stream of plastic material, especially where a suction is not, or cannot be, provided.

In all of the above techniques, free application of the coating material occurs; that is, unless some sort of masking is employed, the entire surface of the article will be coated to some extent. Since masking involves a large amount of hand or machine labor, these techniques are not economically adaptable to the partial coating of an article such as a stator or rotor of an electric motor.

Accordingly, a principal object of this invention is to provide novel apparatus for partially coating an article without masking.

Another object is to provide novel apparatus of the above character which utilizes fluidized particles of the coating material.

A further object is to provide novel apparatus of the above character which can be used for the continuous coating of identical parts on a production line basis.

A still further object is to provide novel apparatus of the above character minimizing waste of coating material.

Another object is to provide novel apparatus of the above character which does not degrade the coating material, so that any excess can be recovered and reused.

A further object is to provide coating apparatus of the above character which can, with some modification, be made portable.

Other and more specific objects will be apparent from the features, elements, combinations and operating procedures disclosed in the following detailed description and shown in the drawings, in which.

It has now been found that a heated article can be partially coated in a specific predetermined pattern by delivering to the surfaces to be coated a laminar flow stream of fluidized particles of the coating material while adjacent surfaces to remain uncoated are subjected to vacuum, either by means of a vacuum "shoe," or by exposure in a vacuum-exhaust-vented coating chamber. The vacuum effectively draws the coating material away and prevents it from adhering, and no premasking is necessary. More particularly, it has been found that, when a spray of fluidized, particulate coating material is impinged upon certain surfaces of an article while a suction is simultaneously applied to those surfaces not to be coated, a clean, well-defined coat will result over the selected areas. No masking or subsequent coat removal operation is necessary.

One embodiment of the apparatus which can perform this method consists, in its barest essentials, of work carrying and heating means, one or more spray nozzles and one or more vacuum shoes. In each instance, each nozzle may have a particular configuration to perform a particular function. The delivery nozzle is preferably so formed that it imparts a laminar flow to the particulate material being sprayed, and laminar flow delivery nozzle conduits are shown in FIGURES 11 and 15–17. The vacuum shoes may be formed to overlie most of the surfaces to remain uncoated. By simultaneous use of the delivery nozzle and a vacuum shoe or vacuum exhaust vent, a predetermined coating of selected surface areas of an object can be accomplished.

If desired, the apparatus just described may be adapted for continuous operation. If so, a conveyor system may be provided with heating, coating, and cooling zones disposed therealong. Intermediate the heating and cooling zones is the coating chamber where the delivery nozzles and vacuum shoes are positioned and function to automatically coat articles selectively and in a continuous manner. A control system operates the delivery nozzles and vacuum shoes to coat articles automatically and continuously coat articles during their passage through the coating chamber.

CONTINUOUS POWDER COATING WITH VACUUM SHOES

Figure 1:
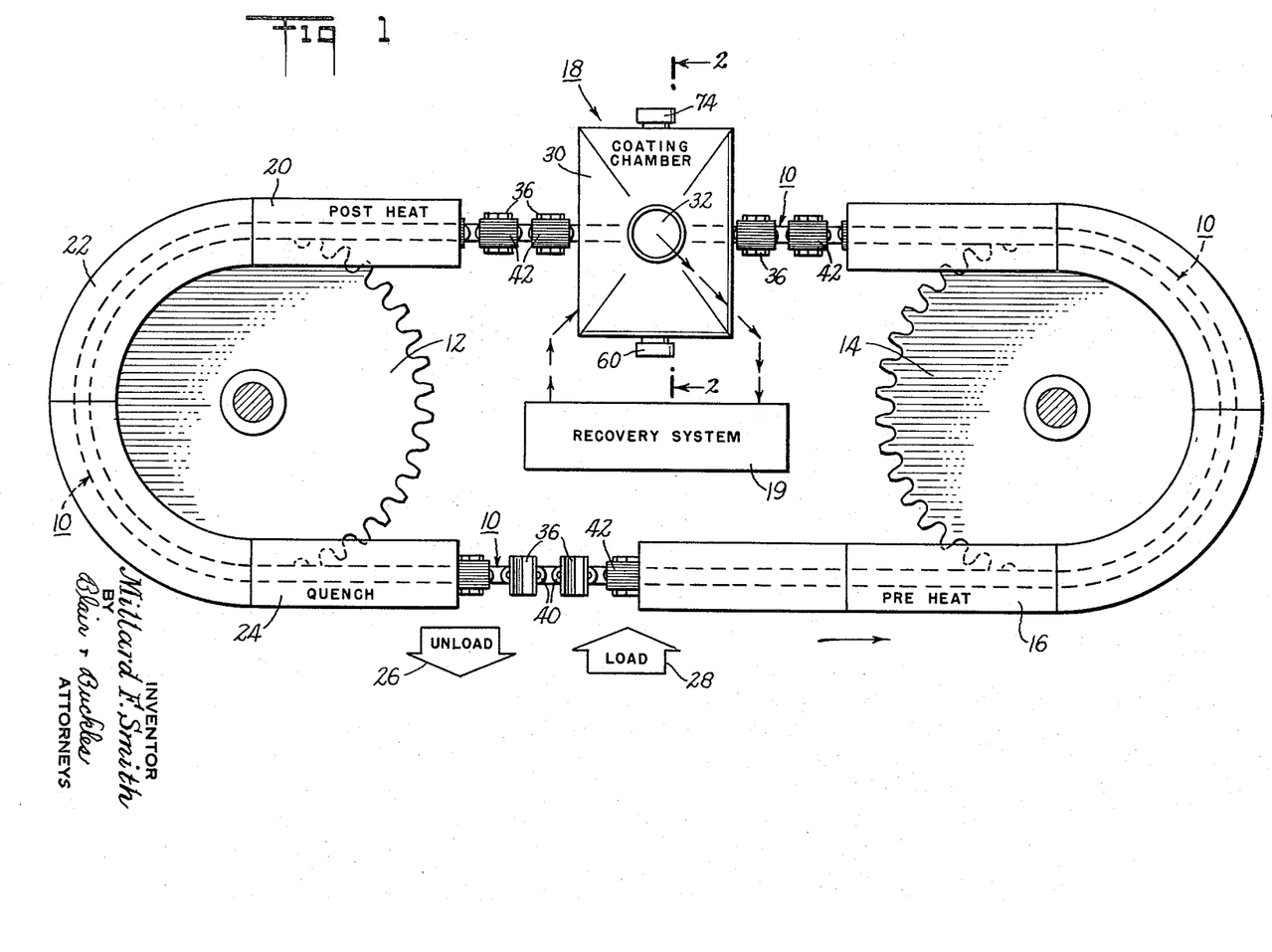
FIGURE 1 is a schematic top plan view of one embodiment of the coating apparatus of this invention.

FIGURE 1 is a schematic diagram of apparatus embodying the basic concept of this invention and designed for the continuous coating of such unitary articles as the rotors and stators used in electric motors. As shown, it consists of an endless chain or conveyor 10 which travels in a horizontal endless loop about toothed wheels 12 and 14. One of the wheels may be power-driven while the other acts merely as a guide wheel.

After leaving load station 28, the conveyor 10 passes through a pre-heat oven 16, a coating chamber 18, post-heat ovens 20 and 22, a quench chamber 24 and an unload station 26.

The pre-heat oven, the post-heat ovens, and the quench chamber are of customary modular design and merely constitute heated or cooled open-ended chambers which surround a portion of the conveyor loop. The coating chamber 18 has a unique construction, and this is described in detail below.

Figure 2:
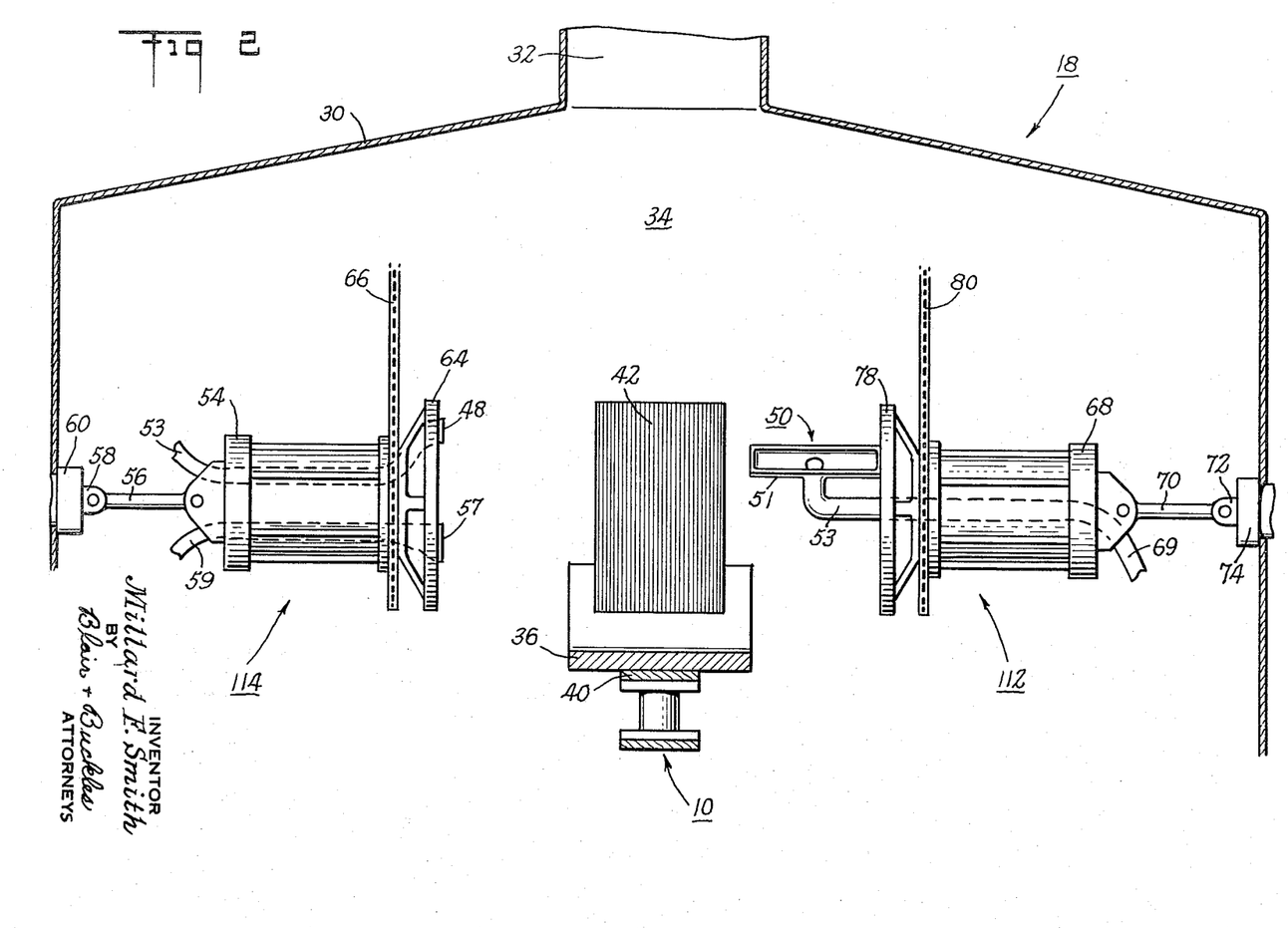
FIGURE 2 is a cross sectional view of the spray chamber of FIGURE 1, taken along line 2—2, showing the stator of an electric motor mounted therein for coating.
Figure 3:
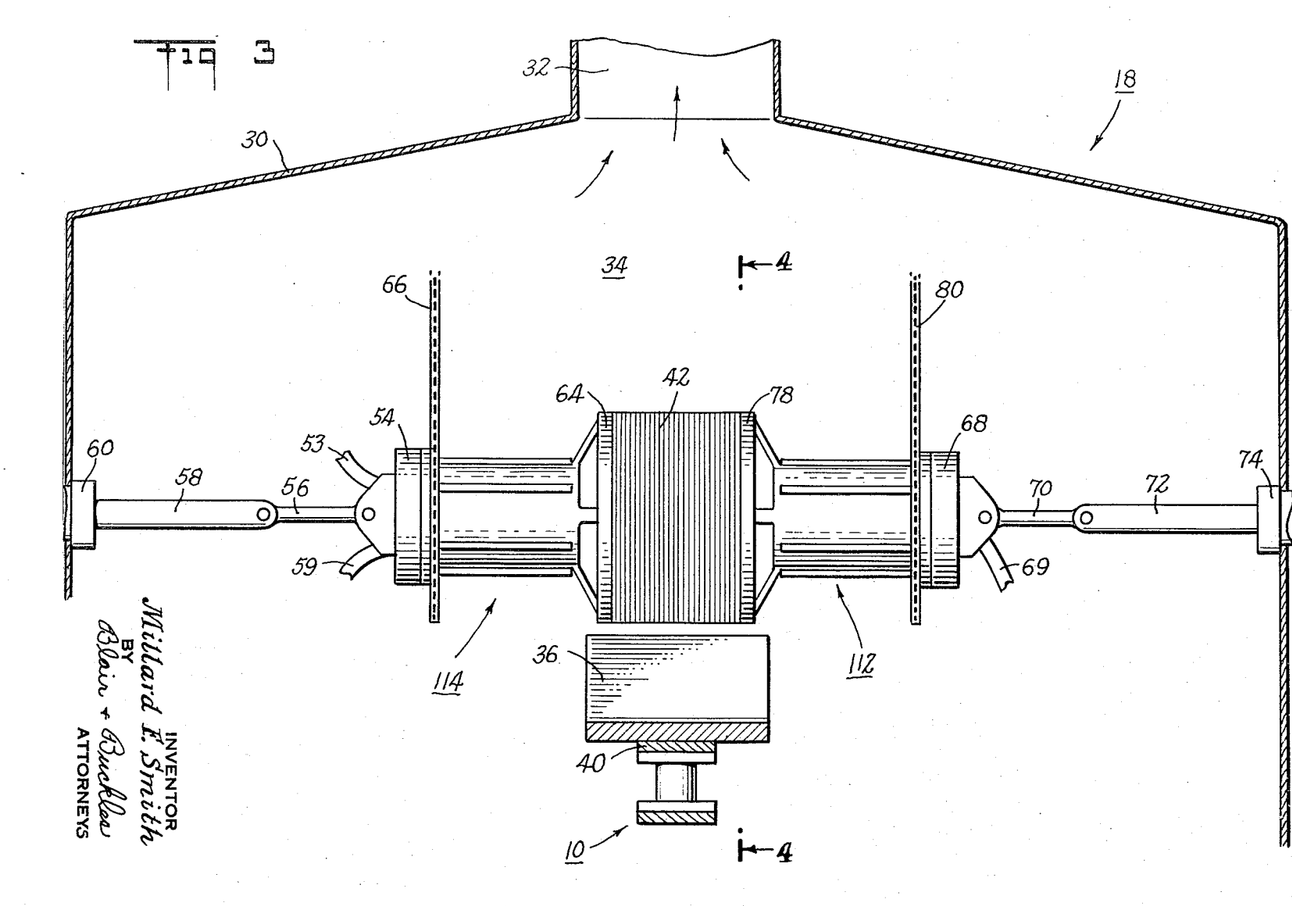
FIGURE 3 is similar to FIGURE 2 and shows the next sequential step in the coating of the stator.

*Coating chamber.*—FIGURES 2 and 3 best illustrate the coating chamber 18. It consists of a hoodlike enclosure 30 with a vacuum exhaust vent 32 in its dome for evacuation of excess fluidized powder particles, vapors, gases, and the like, from the coating zone 34 enclosed within enclosure 30. The vent communicates with a recovery system 19 which scavenges the fluidized powder particles and returns them to the delivery nozzles.

Figure 4:
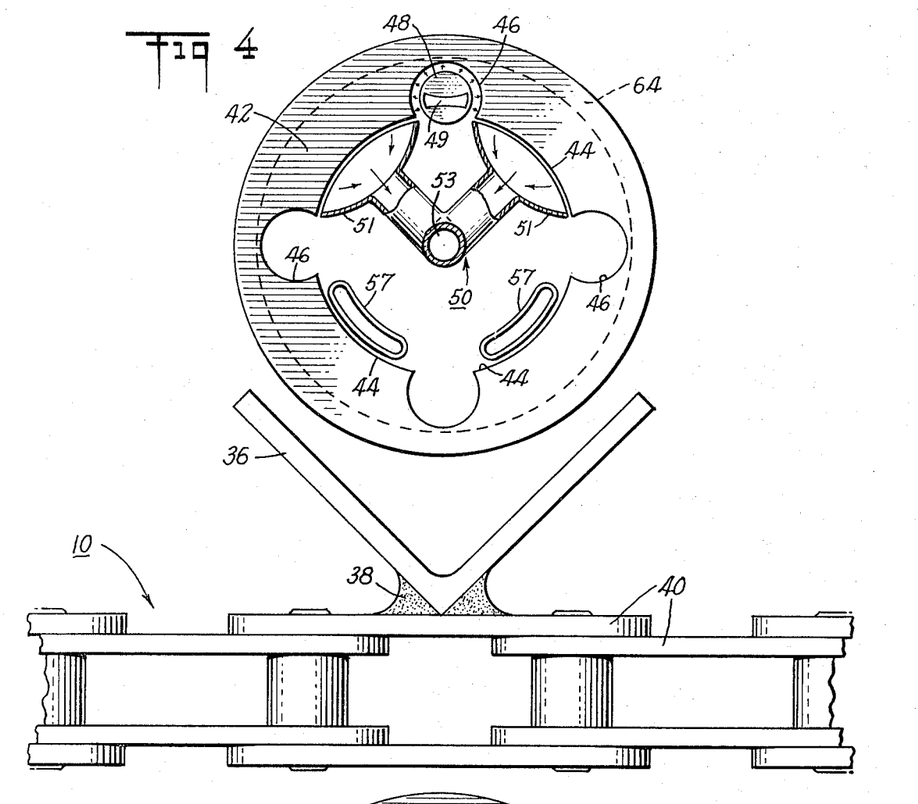
FIGURE 4 is a detailed cross sectional view of the stator, jig, conveyor, delivery nozzles, and vacuum shoes shown in FIGURE 3, taken along line 4—4.

The conveyor 10 travels through the center of the coating zone 34. Positioned periodically along its upper surface are V-shaped supports 36 which support the stator or the rotor as it is transported through the chamber, as shown in FIGURES 2, 3, and 4. These support members are welded, as at 38, onto separate links 40 of the conveyor. The particular size and shape of the supports 36 may be selected to accommodate the parts to be coated most effectively.

Disposed within the support 36 is the unit intended to be coated; in the instance shown it is a stator 42 for an electric motor. In customary practice, the inner faces 44 of the pole pieces of the stator (see FIGURE 4) are left uncoated, while the winding coil apertures 46 formed in the body of the stator are coated with an insulating epoxy resin. Thus, wire subsequently looped about these pole pieces through apertures 46 will be insulated from the body of the stator. Heretofore, uncoated areas on a coated piece required much hand operation, in complex masking or stripping steps, and these are avoided by the present invention. The apparatus consists primarily of at least one delivery nozzle 48, and one masking vacuum shoe 50 or masking air jet 57, as indicated in FIGURES 3 and 4.

Figure 5:
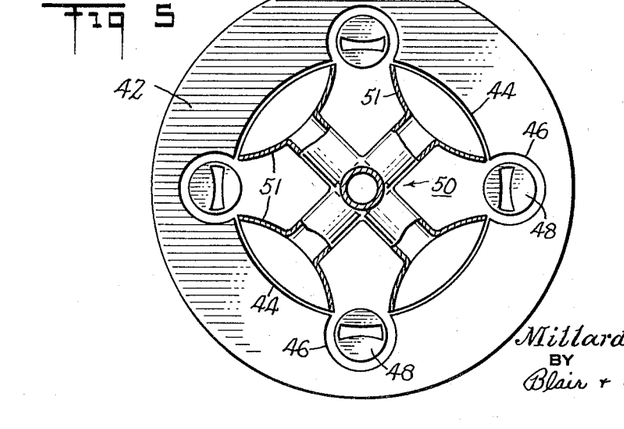
FIGURE 5 illustrates apparatus similar to that of FIGURE 4, incorporating additional delivery nozzles and vacuum shoes positioned within the stator.

The delivery nozzle 48 preferably has an orifice 49 shaped so that a laminar flow will be imparted to the fluidized particulate coating material ejected, for even application of a uniform coating. In one preferred form, the orifice has two opposed convex lips, as shown in FIGURES 4 and 5, and other orifice shapes are also useful with certain coating materials.

The masking vacuum shoe 50 comprises a hoodlike enclosure 51 preferably conforming in shape and dimension to the surface of the part to remain uncoated. Vacuum shoe 50 communicates, via pipe 53, with an exhaust system. One or more positive pressure masking air jets 57 (FIGURE 2) may be directed at portions of the part to be coated, providing masking by diverting the stream of coating material away from surfaces exposed to the air jet. Compressed air is supplied by conduit 59 (FIGURES 2 and 3). As shown in FIGURE 4, the air jets 57 and vacuum shoes 50 "mask" or divert coating particles from selected areas such as the pole piece faces 44a of the stator 42.

*Supporting structure.*—FIGURE 2 shows one form of supporting structure for the nozzles and vacuum shoes. On the left, one or more delivery nozzles 48 and air jets 57 join and are supported by pipes 53 and 59 in manifold 54. Pipe 53 supplies fluidized particles to the manifold 54. Manifold 54, pipes 53 and 59, jets 57, and nozzles 48 are advanced toward the stator 42 by connecting rod 56, piston 58, and cylinder 60. Cage 64 eventually contacts and masks the side wall of the stator. Chain support 66 bears the weight of the entire structural assembly and rotates the stator in successive quarter-turn stages to succesivley juxtapose the winding coil apertures and adjacent pole pieces to the delivery nozzle and vacuum shoes while the conveyor drops slightly to permit this rotary movement.

On the right side, a similar structure exists, except that here the plurality of vacuum shoes 50 actually enter the interior of the stator and position themselves overlying the pole faces 44. Each vacuum shoe 50 is exhausted via vacuum pipe 53 in manifold 68, vacuum being supplied to pipe 53 from pipe 69. The manifold is supported by and moved laterally into the stator by connecting rod 70, piston 72, and cylinder 74. Cage 78 contacts the side of the stator and supports the forward end of the assembly. Chain support 80 bears the weight of the vacuum assembly and supporting structure and also acts to rotate the stator.

FIGURE 5 illustrates a variation in the delivery nozzle and vacuum shoe assembly to avoid rotation of the stator. Here, four delivery nozzles and four vacuum shoes are used.

Figure 6:
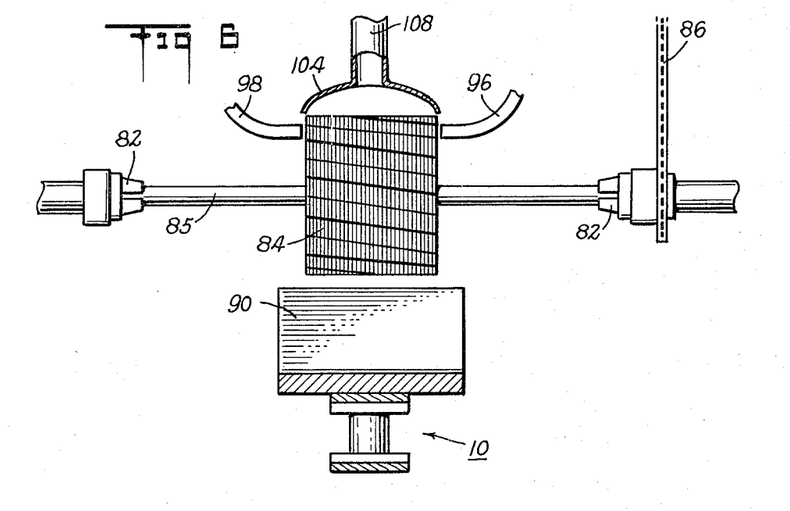
FIGURE 6 is a top plan view, illustrating apparatus adapted for coating the rotor of an electric motor.
Figure 7:
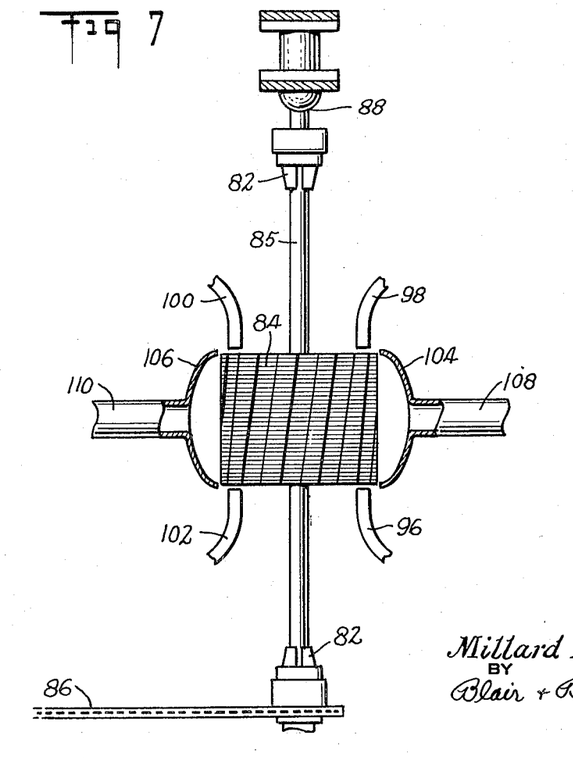
FIGURE 7 illustrates a different, plural nozzle embodiment of the invention for coating the rotor of an electric motor.

FIGURES 6 and 7 illustrate variations in the delivery nozzle-vacuum shoe assemblies adapted to coat the outer surfaces of a different article, such as the outside end walls of a rotor, which may be designed to fit into the stator of FIGURES 4 and 5.

As shown, this embodiment consists of two chucks 82 for holding and rotating the rotor 84 through its shaft 85. In the embodiment of FIGURE 6, the chucks grasp the rotor, lift it off support 90, and rotate it. In the embodiment of FIGURE 7, the chucks act as the support for the rotor and merely rotate it when properly disposed at the coating chamber station. In each instance, one of the chucks is powered via a pulley belt assembly 86, while the other chuck merely acts as a follower and rotates freely in pivot 88 (FIGURE 7).

FIGURE 6 shows two delivery nozzles 96 and 98 which are directed to spray against the upper side end walls of the rotor. FIGURE 7 shows two additional delivery nozzles 100 and 102, or four all told, spraying the side end walls. In each instance, vacuum shoes 104 (FIGURE 6) and 104 and 106 (in FIGURE 7) are utilized to prevent adherence of the fluidized particles upon the circular wall of the rotor. Pipes 108 and 110 supply vacuum to the vacuum shoes.

COATING TECHNIQUE

To effect coating in accordance with the technique of this embodiment of the invention, both the delivery nozzles and vacuum shoes are used simultaneously. The delivery nozzle directs fluidized particles of plastic material onto the heated part, while the vacuum shoes draw away any such material from the selected areas to be left uncoated. Thus, no masking is necessary.

The use of delivery conduits inducing laminar flow characteristics in the stream of powdered coating material minimizes turbulent, random diversion of the powder particles. The stream of powder, delivered at a low velocity, advances directly toward the coating zone. Any excess powder is drawn away from the coating zone into vacuum shoes 50, 104 or 106, or into exhaust vent 32, and excess free air introduced by jets 57 combines with the volume of air introduced through the delivery nozzles to provide a smoothly advancing air stream carrying the powdered coating material toward and past the coating zones and into the recovery system 19 for recirculation and re-use.

Initially, the unit to be coated, such as the stator 42, is loaded onto support member 36 of the conveyor 10 at load station 28. The belt then transports the uncoated stator through a pre-heat oven where it is heated to a temperature above the melting point of the plastic material to be used as a coat. In the usual situation, an epoxy resin is used and, in such instance, the part is heated above the melting temperature of the resin.

The stator now enters the coating chamber 18 (FIGURE 2). The vacuum shoe assembly 112 moves toward and into the stator through the action of cylinder 74 and piston 72. Vacuum shoes 50 enter the cavity of the stator and advance to positions immediately adjacent the pole faces 44 (FIGURES 3, 4, 5). Cage 78 bears against the side of the stator and acts as a support, an aligning means for the vacuum shoes, and a mask for the side of the stator. Vacuum is now supplied via vacuum supply pipe 69.

During or immediately following such positioning of the vacuum shoe assembly 112, the delivery nozzle assembly 114 moves forwardly via cylinder 60 acting on piston 58 (FIGURES 2, 3). Cage 64 bears against the opposite side of the stator, and delivery nozzle 48 shown in FIGURE 2 is now positioned at the entrance to one of the winding coil apertures 46 (FIGURES 4, 5). A stream of fluidized solids, such as a finely powdered epoxy resin coating material suspended in a flowing stream of air, is now supplied to the nozzle, and the orifice 49 preferably imparts a laminar flow to the stream as it is ejected. The stream of fluidized particles flows over the heated surface of the winding coil aperture 46 of the stator. Many particles of coating material adhere to the surface of the heated stator. The excess particles are diverted by air jets 57 and drawn out and away from other surfaces of the stator, particularly the pole faces 44, via vacuum shoes 50 or exhaust vent 32. The drawn-off excess plastic material is recirculated to the supply system for re-use.

After the spray coating, the stator is taken from the coating chamber 18 and transported to post-heat ovens 20 and 22 where additional heat is supplied to thoroughly fuse the adhered particles together. It is then quenched to room temperature in quench chamber 24. The stator is removed from the conveyor belt 10 at unload station 26. On inspection, it is found that only the winding coil apertures have been coated with epoxy resin.

The coating of rotors employs a similar technique. The only actual differences are the supporting jig and the particular configuration and number of delivery nozzles and vacuum shoes employed.

As shown in FIGURES 6 and 7, each vacuum shoe has sufficient flare to cover the width of the cylindrical center of the rotor. Each delivery nozzle is similar in structure to those previously described. In this instance, however, they direct fluidized plastic solids against the side end walls of the core while the rotor is being rotated. Thus, complete coating of the side walls is accomplished. No coating of the outer periphery occurs.

It should be evident to the reader that the hereindescribed apparatus and process with modification has broad application for the coating of many kinds of articles in addition to the rotors and stators specifically described. The invention is uniquely adapted for the selective coating of articles on a volume production-line basis. The use of vacuum shoes permits negative pressure or partial vacuum to provide "masking" action by withdrawing the flowing stream of coating material from areas to be left uncoated. Jets of compressed gas, such as the air jets 57, similarly deflect the coating stream from areas to be left uncoated, and such jets may be used either alone or in conjunction with the vacuum shoes to provide masking of selected areas of the article coated.

Other conveyors and materials handling techniques can readily be used to carry the articles through the processing zones. For example, inclined ramps and chutes with timed gates can dispense the articles to the coating station, and idler rollers can support the article while it is rotated in the coating stream by a friction drive roller, until an ejector ram urges the coated article into a delivery conveyor to subsequent stations for further heating or the like.

Furthermore, the coating of motor parts may be partly completed before windings are aded; the winding wire itself may be coated with a partially cured insulating coating, and after windings are in position on the motor part, further coating and/or heat treatment provides final curing combined with curing and fused impregnation or encapsulation of windings, forming a unitary solid construction.

CONTINUOUS POWDER COATING WITHOUT VACUUM SHOES

Figures 8, 9, 10:
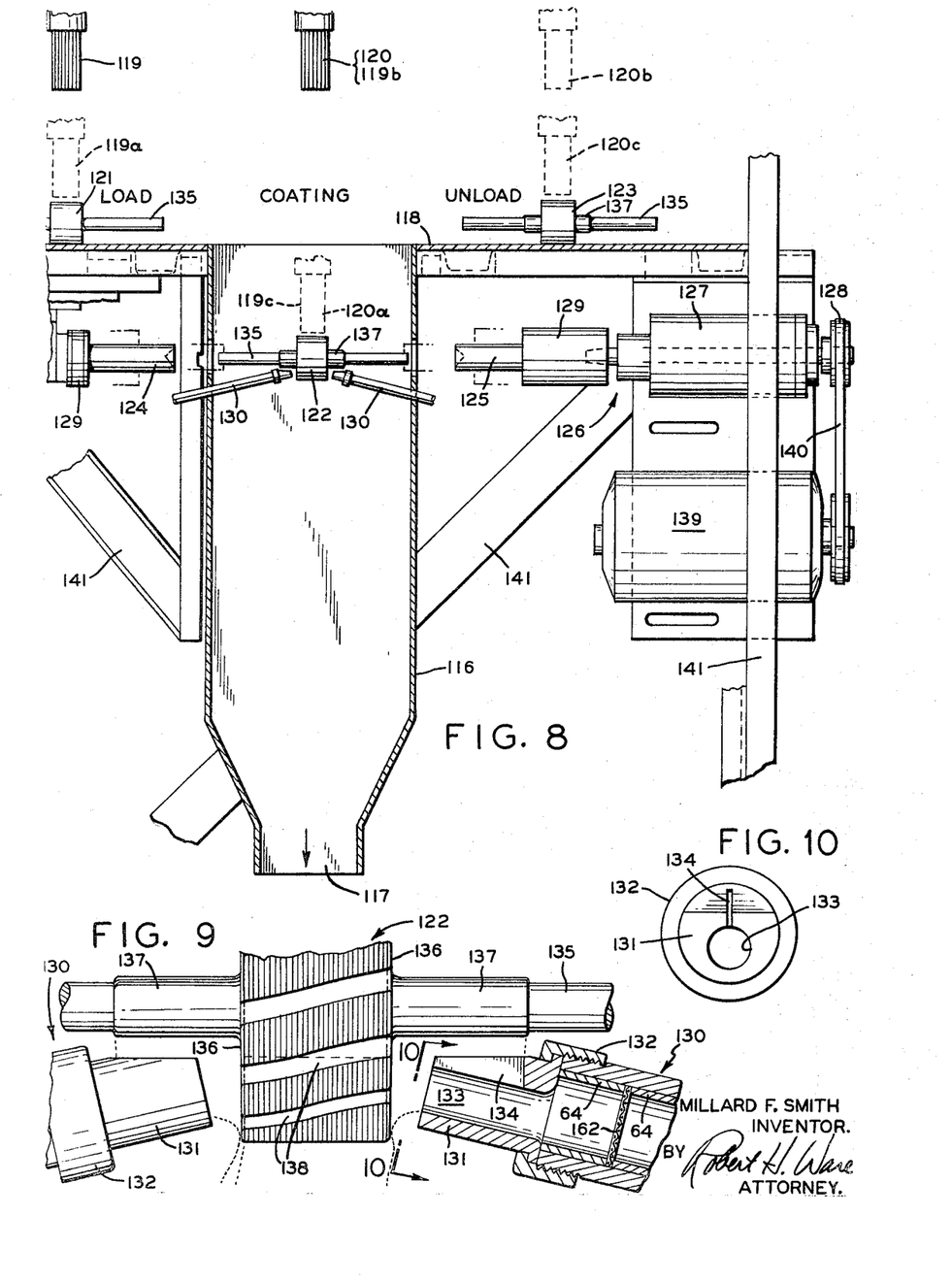
FIGURE 8 is a fragmentary, cut-away elevation view of coating apparatus incorporating another embodiment of the invention.
FIGURE 9 is an enlarged fragmentary elevation view, partially in section, of the coating station of the apparatus of FIGURE 8.
FIGURE 10 is a fragmentary end elevation view of the apparatus shown in FIGURE 9.

Another embodiment of the coating apparatus of this invention is illustrated in FIGURES 8, 9 and 10, where the coating operation is performed without the use of close-fitting vacuum shoes. In FIGURE 8, a vertically elongated coating chamber 116 is provided with a bottom vacuum exhaust vent 117. The open top of chamber 116 forms an aperture in a handling deck 118, above which is mounted the materials hadling apparatus for delivering uncoated workpieces and removing coated workpieces, as shown in FIGURE 8. This handling apparatus includes two electromagnetic grippers 119 and 120 employed to move the workpieces through the coating apparatus. A workpiece 121 is shown at the load station, at the left-hand side of FIGURE 8; a workpiece 122 is shown at the coating station in the central upper portion of the coating chamber 116; and a workpiece 123 is shown at the unload station at the right-hand side of FIGURE 8.

The workpieces 121–123 are here shown as motor armatures which arrive at the load station from suitable chutes or conveyors after passing through preheat ovens as shown in FIGURE 1. The workpiece 123 at the unload station is carried away from the coating apparatus of FIGURE 8 by similar conveyors or chutes, which may pass if desired through post-heat ovens and quench stations, as shown in FIGURE 1.

*Workpiece delivery to and from coating station.*—In order to deliver the workpiece from the load station to the coating station, the electromagnetic grippers 119 and 120 first move downward until gripper 119 is in position 119a gripping a workpiece 121, and gripper 120 is in position 120a gripping a workpiece 122 which has already been coated at the coating station. Both grippers next withdraw upwardly retracting until their respective armatures clear the handling deck 118. The grippers then move to the right in FIGURE 8 until gripper 119 is directly above the coating chamber 116 in the position 119b, and gripper 120 is directly above the unload station, at position 120b. Both grippers then move downward, with gripper 119 telescoping downward within the upper portion of coating chamber 116 to the position 119c (corresponding to 120a) at which its armature is positioned at the coating station, while the gripper 120 moves downward only to the position 120c, bringing its armature to the unload station.

Before electromagnetic gripper 119 is de-energized, an idler spindle 124 and a co-axial drive spindle 125 move axially toward the armature at the coating station to engage and hold the opposite ends of its shaft in a self-centering resilient grip. The drive spindle 125 is supported by an indexable and rotatable mounting 126 including an extensible air cylinder 127, a drive pulley 128 and a compressible assembly 129. The idler spindle 124 is supported in a similar bearing by a similar compressible assembly 129 mounted in a similar extensible air cylinder, and both spindles are thus adapted for self-adjusting resilient gripping seizure of the ends of the armature 122 positioned at the coating station in the coating chamber 116. The normal operation of the spindles through the extension of the pistons in their cylinders 127 brings the compressible assemblies 129 toward each other until the ends of the spindles 124 and 125 engage the ends of the armature shaft held by gripper 119c. Further extension of the mating air cylinders 127 supporting the idler spindle 124 produces resilient compression of the assemblies 129, firmly gripping the armature at the coating station. Grippers 119 and 120 are now de-energized and withdrawn to retracted positions clearing the handling deck 118, and the coating operation begins.

Figure 11:
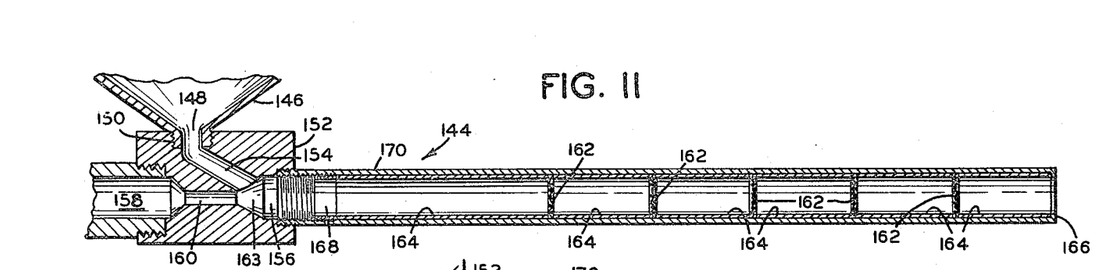
FIGURE 11 is a cross-sectional side elevation view of an air-powder mixing chamber and stream-projecting gun employed in the coating systems of the invention.

*Coating operation.*—In the embodiment of the invention shown in FIGURE 8, the powdered coating material is delivered in a slowly moving air stream entering the coating chamber through two laminar flow projection guns 130. Both guns 130 have transverse flow-straightening screens 62 as shown in FIGURES 9 and 11, producing substantially laminar flow of the advancing stream of powder entrained in air. While the laminar flow characteristics of this advancing stream are not fully understood, they apparently produce smooth streamlines and a substantially constant velocity at all lateral points across the advancing stream, and substantially constant pressure at all points across the stream, while also minimizing or eliminating boundary layer drag or friction of the stream along the inside walls of the guns 130.

The laminar flow characteristics of this advancing stream apparently permit unusually large quantities of powdered material to be entrained in the moving air. Weights of powder eight or more times the weight of the entraining air may be continuously moved by these laminar flow systems and delivered to the coating station at extremely low pressures and low velocities. This low velocity advancing stream of air carrying large quantities of powdered coating material is combined with a vacuum exhaust vent 117 gently drawing off the air moving through the coating chamber 116, producing smoothly flowing patterns of slow-moving air carrying the coating powder directly to the target area of the workpiece in the coating station and directly away from the piece before any turbulent diversion of the powder deposits it upon workpiece surfaces not intended to be coated.

In addition, the low velocity of the arriving air stream minimizes cooling of the heated workpieces from the preheat ovens, leaving them at high temperatures sufficient to melt, fuse and glaze the deposited coating material in place on the selected coating areas of the workpiece.

As shown in FIGURES 8 and 9, two stream projection guns 130 are each aligned at an angle directed toward the side face of the rotor and adjacent shaft portion of the motor armature 122 to be coated at the coating station in coating chamber 116. Armature 122 is rotated during the short coating operation, while the powdered coating material is delivered by nozzles 131.

The construction of the powder delivery nozzle 131 preferably employed in this embodiment of the invention is shown in FIGURES 9 and 10 where the projection gun 130 has a threaded tip on which a flanged projection nozzle 131 is secured by a complementary flanged threaded clamping sleeve 132. Passing through the nozzle 131 is an off-center axial aperture 133 through which the major bulk of the powdered coating material moves from gun 130 directly to the side face and winding slots of the armature 122 to be coated by the coating material. A radial slot 134 passing from the aperture 133 to the outer surface of the nozzle 131 delivers a minor portion of the powdered coating material upwardly toward the portion of the armature shaft 135 to be coated during the coating operation.

As shown in FIGURE 9, the coating material is deposited on the rotor side faces 136 and central shaft portions 137 of the armature, respectively. The coating material is likewise deposited in the winding slots 138 of the rotor, as indicated in FIGURE 9, in the same manner as it is deposited in the winding apertures 46 of the stator 42 shown in FIGURE 4, for example.

The peripheral face of the rotor is left entirely free of powdered coating material, since all of the powdered coating material not moving directly to the workpiece 122 is carried away by the departing air stream moving toward vent 117. The open top of coating chamber 116 supplies additional advancing air, which combines with the volume of air delivered through coating guns 130 to provide a slowly-moving ambient atmosphere departing through vent 117, drawing away all excess powder before it can be deposited on the selected surfaces of workpiece 122 intended to remain uncoated.

During the brief coating period of a few seconds, the slowly-moving powder-entraining air stream is projected through coating guns 130 toward workpiece 122. During this period spindles 124 and 125 rotate workpiece 122 through several complete revolutions, producing even distribution of coating material over coating areas 136 and 137 and the internal walls of slots 138 around the entire periphery of the armature 122. This rotation of the workpiece is produced by a motor 139 mounted at the right-hand side of the apparatus and connected to drive pulley 128 on the shaft of drive spindle 125 by a drive belt 140. All parts of the apparatus shown in FIGURE 8 are supported on a suitable base frame, some of whose structural elements 141 are shown fragmentarily in FIGURE 8.

LAMINAR FLOW STREAM DELIVERY ASSEMBLIES

Illustrated in FIGURES 11–17 are the various devices forming the laminar flow stream delivery systems of this invention. All of these stream delivery systems employ flow straightening devices such as the transverse screens 162 and 200 shown in FIGURES 11, 12, and 15–17.

The powdered coating material, which may range in particle size from sub-micron sizes up to 250 microns in diameter, is introduced to the flowing air stream at a velocity-reduction point, such as the abruptly widening region of a Venturi section of the conduit conveying the stream of air toward the coated object. This produces thorough mixing of the powdered coating material in the air stream, which then passes through a projecting tube or gun incorporating serially-arrayed flow-straightening members which induce the desired laminar flow characteristics, such as the screens shown in FIGURES 11, 12 and 15–17, for example.

Figure 12:
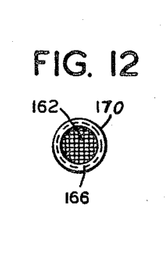
FIGURE 12 is an end-elevation view of the device shown in FIGURE 11.

The flowing stream may be constrained at the outlet end of the projecting gun or diverted laterally as shown in FIGURES 9 and 10; or it may be unconstrained, as shown in FIGURES 11 and 12. In each case the flowing stream of air carrying the powdered coating material is projected toward the surface of the object to be coated, which is preferably preheated by adjacent electrical heating elements. These heating elements bring the coated surface to a temperature at which the impinging powdered coating material will adhere and fuse thereto.

Relative motion between the path axis of the impinging stream and the coated surface is generally desired, so that a continuously flowing stream can be used to coat a large area of the object's surface. Examples of coating apparatus providing such relative motion are illustrated in FIGURES 3, 6, 7, 8 and 14.

A schematic diagram of the laminar flow-inducing portion of a projecting gun 144 employed in the present invention is shown in FIGURES 4 and 5. In these figures a tube 170 directs the stream of air and powdered coating material toward the coated surface, and is provided with longitudinally spaced transverse mesh screens 162 interposed in the path of the moving air stream.

The screens 162 are preferably arranged with their axes substantially parallel, and the mesh sizes of the screens are preferably selected to provide screen apertures about ten times the average diameter of the particles of coating material carried in the flowing air stream. Screens of this mesh size appear to provide optimum flow-straightening of the passing stream, while at the same time minimizing clogging or particle build-up in the screen mesh.

After the air stream carrying the powdered coating material is directed through these spaced, longitudinally arrayed transverse screens, it passes through an exit orifice 166 toward the surface of the object to be coated. As shown in FIGURE 10, the orifice may be shaped to provide a particular cross sectional pattern or shape in the flowing stream issuing from the projecting gun 144.

A stream projection tube having a plain exit orifice is illustrated in FIGURE 11, and a series of internal tube segments 164 are there shown positioned inside the tube 170 of projecting gun 144 with the flow-straightening screens 162 being positioned between and spaced apart by the successive tube segments 164.

The laminar-flow stream-projecting gun 144 shown in FIGURE 11 incorporates an "expansion" mixing chamber 156 in which the powdered coating material is introduced into the flowing air stream as it passes toward the flow-straightening screens 162 in the connecting projecting tube 170. A funnel-shaped hopper 146 for the powdered coating material has its outlet end 148 threaded into an aperture 150 in a mixing block 152 communicating with a powder feed passage 154 passing downwardly through the mixing block 152 and opening into the expansion mixing chamber 156. Compressed air from an air inlet conduit 158 is admitted to a reduced-diameter air feed passage 160 formed in the block 152 and opening into the expansion mixing chamber 156. The mixing chamber 156 is preferably formed wih an internal diameter four or five times greater than the inside diameter of the air feed passage 160, and this change in diameter is achieved abruptly at the conical surface 163, which may diverge from the axis of air feed passage 160 by an angle in the neighborhood of 60°. The powder feed passage 154 opens through the conical surface 163 into the expansion mixing chamber 156, and the axis of powder feed passage 154 is preferably substantially normal to that portion of surface 163 through which it opens in the preferred embodiment of the invention fragmentarily illustrated in FIGURE 13. The abrupt change in diameter of the air feed passage 160 as it enlarges to form the expansion mixing chamber 156 produces a sharp deceleration of the moving air which apparently enhances the mixing of the powdered coating material entering the chamber 156 through the feed passage 154.

After this thorough mixing is completed, the air-powder mixture proceeds down the length of the projecting gun 144, where it passes successively through each of the axially spaced transverse screens 162. These screens are positioned at the desired axial distance by internal tubular segments 164 spaced between the screens 162. The tubular segments 164 are held in position at the exit end of the gun 144 by an internal flange 166, and they are maintained in their desired axial, longitudinal spacing by the threaded lock ring 168, internally threaded into the inlet end of the tube 170, which is itself threaded into the mixing block 152 to provide the outlet passage from the expansion mixing chamber 156.

Figures 13, 14:
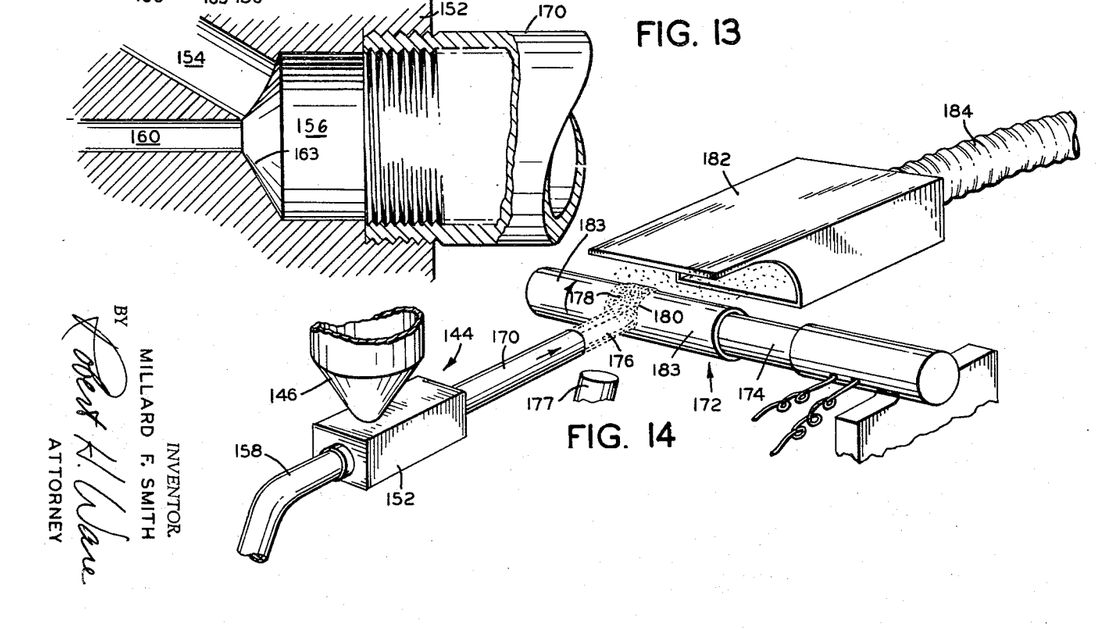
FIGURE 13 is an enlarged fragmentary cross-sectional side elevation view of the air-powder mixing chamber employed in one form of the present invention.
FIGURES 14 and 15 are fragmentary diagrammatic perspective views showing the stream projection system, the powder coating operation and the powder recovery devices in two different embodiments of the invention.

The projecting guns illustrated in FIGURES 11, 12 and 13 are employed in the embodiments of the present invention in which an exterior surface of a flat or a curved object is to be coated with a powdered coating material. In FIGURE 14, for example, a cylindrical tube 172 is rotatably held in a chuck member (not shown), and positioned in the path of the coating material stream 176. An internal heating element 174 is positioned inside the tube 172 and supplies heat to the region of the tube positioned to receive coating material in the stream 176 from the projecting gun 144.

Tests of the combination of the laminar flow projection tube 144 with the expansion-mixing chamber 156, as shown in FIGURES 11 and 13 have established the fact that unexpectedly large quantities of powdered material are drawn through the device. Prior art publications have suggested that only a 1:1 weight ratio of powder to air could be carried in a directable stream of air. With this invention, however, much higher powder-to-air weight ratios, up to 10 to 1 or greater, can be achieved.

The number and alignment of the screens 162 importantly affects the rate of flow, for six screens with their axes aligned in the configuration of FIGURE 11 produce a rate of flow double that with only two screens having their axes randomly disoriented.

The laminar flow characteristics, parallel stream-lines and substantially equal pressure and velocity at all points across the flowing stream 176, which is directed toward the object 172 by the projecting gun 144, provide a high degree of control over the pattern and accurate edge positioning of the coating 178 produced on the object 172. The laminar flow stream 176 avoids spraying or scattering of the powdered coating material as it travels toward the object 172, and enhances the smoothness and uniformity of the resulting coating 178, also producing sharply delineated edges 180 between the coating 178 and adjacent uncoated surfaces 183. The object 172 may be rotated once or several times while the stream of coating material 176 is impinging on it, and axial or helical motion may also be imparted to the object 172, providing longitudinally extended coated areas thereof.

The exhaust and recycling of the excess powdered coating material is achieved by a vacuum hood 182 connected by a vacuum conduit 184 to the intake of a blower (not shown). The hood 182 is positioned close to the coated object 172 in the path of the flowing stream 176. Upon removal of the object 172 after coating, vacuum hood 182 receives the entire volume of stream 176 until a new object 172 is interposed. In FIGURE 14, for example, the object 172 and its supporting assembly might be lowered or indexed away from stream 176 to permit insertion of a new object 172 for the next coating operation.

Powdered coating material drawn into hood 182 and through conduit 184 by the blower is thence returned to a powder storage station, such as the supply hopper 146, ready for recycling.

Figures 15, 16, 17:
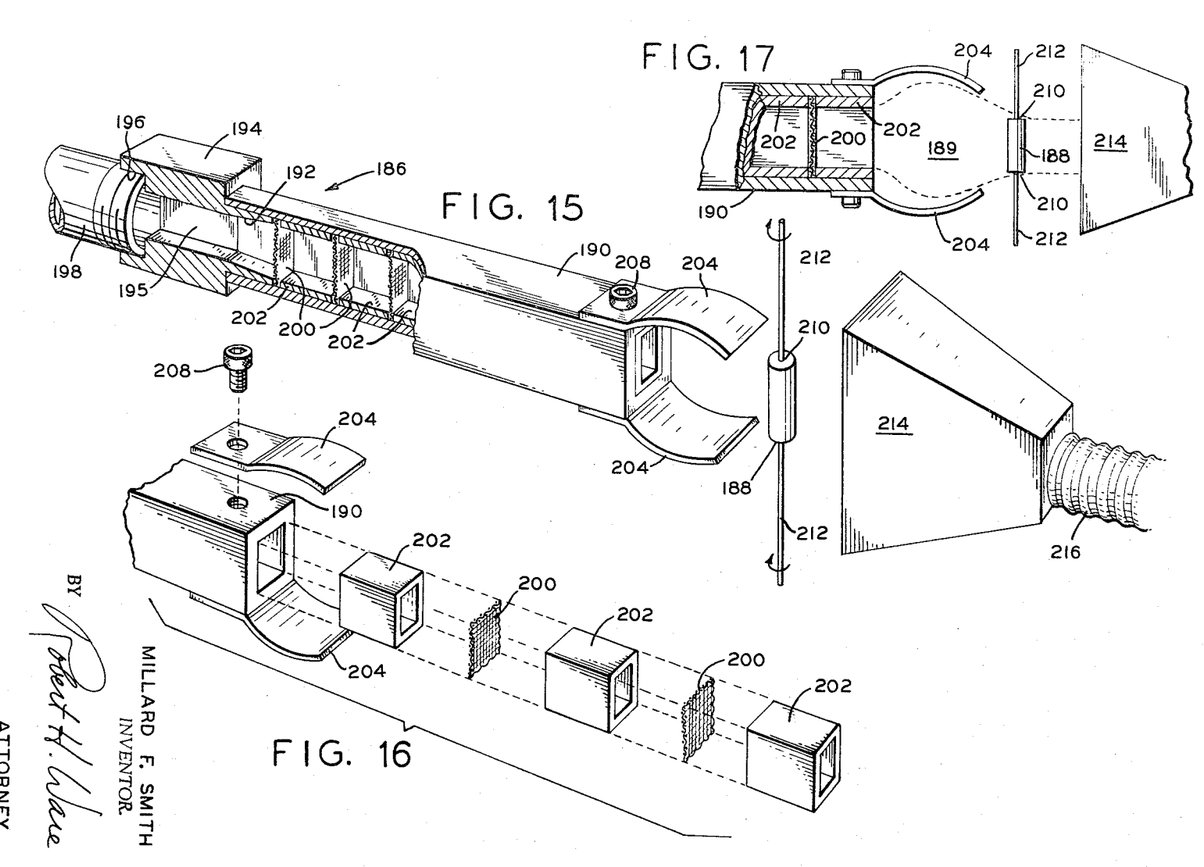
FIGURE 16 is a fragmentary exploded perspective view of the stream projection device of FIGURE 15.
FIGURE 17 is a fragmentary side elevation view, partially broken away, of the apparatus shown in FIGURE 15, showing the coating operation performed therein.

Another similar laminar-flow inducing projection gun 186, illustrated in FIGURES 15–17, is used for applying coatings to the central cylindrical body portions of electronic components, such as the Carborundum Company's "varistor" 188 shown in FIGURES 15 and 17, while leaving its terminal wires completely uncoated. To accommodate the elongated cylindrical varistor, the powder-carrying air-stream 189 has an elongated rectangular cross section. This air-stream 189 is delivered by a rectangular conduit 190, which is joined by an adapter or anchor block 194 to a delivery conduit 198. A passageway 195 extends through block 194 from a threaded entrance portal 196, joined to a threaded end of conduit 198, to the opposite end of the block, where its exit is surrounded by a flange 192, rectangular in shape, over which conduit 190 is secured by its force fit.

A series of aligned, transverse screens 200 are axially spaced apart along the interior wall of the rectangular conduit 190 by a series of telescopingly fitted spacer conduit segments 202, each having an external rectangular cross-section fitting within the internal rectangular passageway of the conduit 190, as shown in FIGURE 16.

A pair of deflector blades 204 preferably arched concavely outwardly flanking the advancing stream issuing from the gun 186 are anchored to the exit end of the gun 186 adjacent to opposite parallel edges of the rectangular exit 206. Blades 204 may be secured to the rectangular conduit 190 by such means as the screws 208 shown in FIGURES 15–17, and the screws 208 may perform the additional function of anchoring the outermost spacer conduit 202 in its predetermined position, thus securing all of the transverse screens 200 in their desired axially spaced locations along the length of the interior of conduit 190. These screens 200 preferably have their respective "warp" and "woof" directions parallel with each other and they preferably have apertures approximately ten times the average particle size of the powdered coating material being delivered by the gun 186, although the gun will deliver a wide range of particle sizes with high effectiveness.

As shown in FIGURE 17, the blades 204 are shaped and positioned to direct the advancing stream of powdered coating material toward the body of the varistor 188 with the narrow edges of the stream passing across the small end surfaces 210 of the varistor 188, which is suspended directly in the path of the advancing stream of powdered coating material, supported and rotated by its protruding terminal wires 212. A vacuum exhaust vent or hood 214 is positioned as shown in FIGURES 15 and 17 to receive excess powdered coating material passing the varistor 188 and connected by a hose 216 to a vacuum pump (not shown) which returns the excess powdered coating material for recirculation and reuse.

Figure 18:
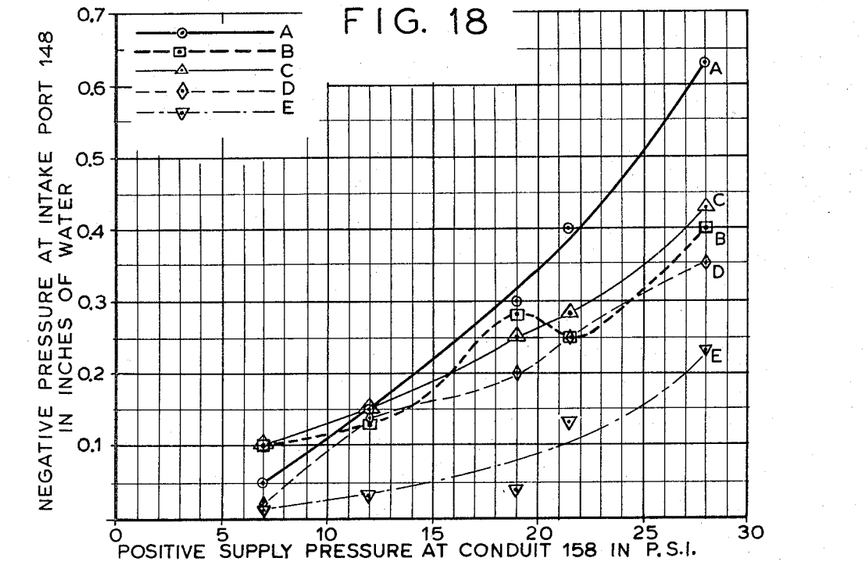
FIGURES 18 and 19 show comparative performance curves of the assembly of FIGURE 11 and its modifications.
Figure 19:
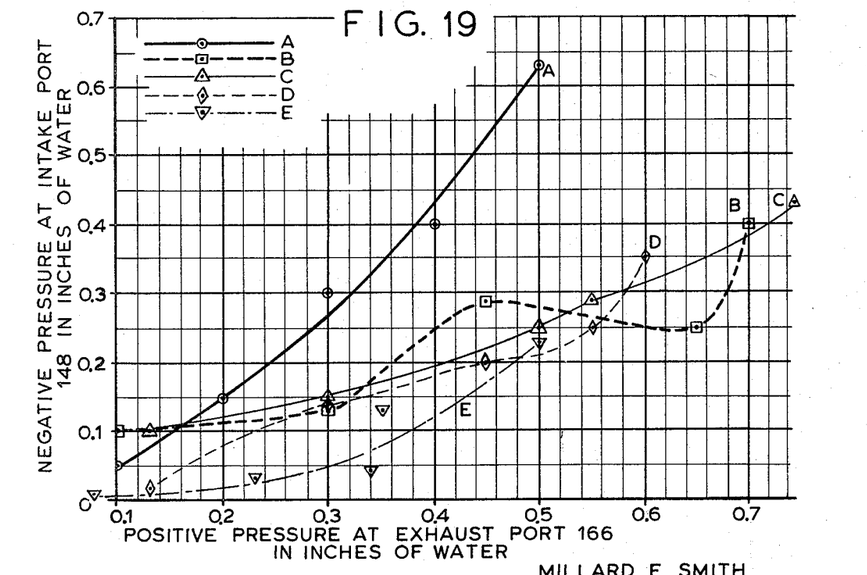

*Effectiveness of flow straightening systems.*—As shown in FIGURES 18 and 19, the flow straightening systems of the invention typified by the screens 162 and 200 shown in FIGURES 9, 11 and 15–17 produce substantial enhancement of the normal aspirating operation of the mixing chamber 156 in the mixing block 152 illustrated in FIGURES 11 and 13. FIGURE 18 is a graph showing variations in negative intake pressure measured at intake port 148 for different supply pressures at conduit 158, the data tabulated in Table I. FIGURE 19 is a graph showing variations in the negative pressures measured at the intake port 148 in FIGURE 11 corresponding to various positive pressures measured at the orifice or exhaust port 166 of the laminar flow projection gun 144, the data tabulated in Table II.

The line A in FIGURES 18 and 19 represents the series of negative pressures measured with a projection gun 144 incorporating six transverse screens 162 as shown in FIGURE 11 with their "warps" and "woofs" aligned parallel, and with spacer elements positioning all six screens spaced one half inch apart down the length of the cylindrical conduit 170. The remaining curves B, C, D and E represent the following comparable devices:

B—aspirator 152 and cylindrical conduit 170, employing no transverse screens;

C—same as B with the first screen only;

TABLE I.—SUPPLY AND INTAKE PRESSURES COMPARED

| Supply Pressure at Conduit 158 (p.s.i.) | Negative Pressure at Intake Port 148 (inches of water) | | | | |
|---|---|---|---|---|---|
| | A | B | C | D | E |
| 7.0 | 0.05 | 0.10 | 0.10 | 0.02 | 0.01 |
| 12.0 | 0.15 | 0.13 | 0.15 | 0.14 | 0.03 |
| 19.0 | 0.30 | 0.28 | 0.25 | 0.20 | 0.04 |
| 21.5 | 0.40 | 0.25 | 0.28 | 0.25 | 0.13 |
| 28.0 | 0.63 | 0.40 | 0.43 | 0.35 | 0.23 |

TABLE II.—EXHAUST AND INTAKE PRESSURES COMPARED

| A | | B | | C | | D | | E | |
|---|---|---|---|---|---|---|---|---|---|
| 166 [1] | 148 [2] | 166 | 148 | 166 | 148 | 166 | 148 | 166 | 148 |
| 0.10 | 0.05 | 0.10 | 0.10 | 0.13 | 0.10 | 0.13 | 0.02 | 0.08 | 0.01 |
| 0.20 | 0.15 | 0.30 | 0.13 | 0.30 | 0.15 | 0.30 | 0.14 | 0.23 | 0.03 |
| 0.30 | 0.30 | 0.45 | 0.28 | 0.50 | 0.25 | 0.45 | 0.20 | 0.34 | 0.04 |
| 0.40 | 0.40 | 0.65 | 0.25 | 0.55 | 0.28 | 0.55 | 0.25 | 0.35 | 0.13 |
| 0.50 | 0.63 | 0.70 | 0.40 | 0.75 | 0.43 | 0.60 | 0.35 | 0.50 | 0.23 |

NOTES: [1] Exhaust pressure at orifice 166, inches of water.
[2] Intake pressure at port 148, inches of water.

All values were determined in the system of FIGURE 11, with these screen assemblies:

A: six screens 162, all aligned
B: no screens
C: one screen
D: two screens, not aligned
E: six screens, not aligned D—same as B with the first and second screens only, not aligned;

E—aspirator 152 and tube 170 with all six screens installed but with their "warps" and "woofs" not aligned.

Thus, as shown by the upper curve A in FIGURES 18 and 19, in addition to permitting the entrainment of large volumes of powdered material in the slow-moving air stream, the presence of a large plurality of aligned transverse screens axially spaced along the interior of the delivery conduit significantly increases the aspirating performance of the system incorporating the mixing aspirating chamber 156.

Conventional powder "spray" coating techniques generally employ a fluidized bed for feeding the powder to be sprayed into a spray gun. Such fluidized beds unavoidably produce classified stratification of the various size particles of powder present in the bed. Thus the fines generally reach the spray gun first, and may pass through it efficiently, but coarser particles subsequently reaching the spray gun often clog or jam the spray gun, requiring frequent shut-downs for cleaning. With the powder delivery systems of the present invention, a standard industrial powder conveyor with a vibrating hopper, such as an Eriez "10-A" conveyor, may deliver the powder directly to the hopper 146 shown in FIGURE 11, and the particle size and range of the powder is immaterial. The delivery systems of this invention will accept, convey and deliver powder over a wide range of particle sizes.

The various embodiments of the invention shown in the figures all employ the same coating process to produce the smooth and uniform coatings of this invention.

In its preferred form, this process involves the following principal steps:

(1) Mixing a dry powdered coating material into a flowing stream of compressed air or other gas, preferably in an expansion mixing chamber in which the velocity of the air is arrested rather abruptly at the point where the mixing occurs;

(2) Conducting the mixed stream of powder and compressed air down the length of a projecting tube or gun having flow-straightening means such as transverse screens positioned at intervals therealong, preferably with their principal axes aligned parallel or on a smoothly twisting helical plane;

(3) Directing the mixed stream of powder and air issuing from the projecting gun toward the surface of the object to be coated;

(4) Supplying heat to melt the powdered coating material, whereby it adheres to the coated surface and fuses into a uniform coating thereon with sharply delineated edges;

(5) Positioning a vacuum exhaust vent, hood or vacuum shoe to receive the stream of air and powdered coating material after it passes the object to be coated, to collect excess coating material and return it to the coating supply;

(6) If desired, producing relative movement between the stream of coating material and the object to be coated, thereby providing an enlarged coating area having the same sharply delineated edges as the laminar flowing stream.

The temperature of the object to be coated is generally maintained at a point higher than the melting or fusing temperature of the coating material during the coating process, and it may be maintained at a high level for a time, to enhance the smoothness of the resulting coating. Alternatively, the dry particulate coating material may be heated above its melting temperature by passing it from the projecting gun through a flame, a laser beam, or a radiant heating zone as it moves toward the object to be coated.

Example I

General Electric polyester resins were employed to coat motor armatures in the coating chamber 116 illustrated in FIGURE 8, using 100 to 200 mesh (screen) particle sizes, the percentages of the particles falling in various parts of this range being unimportant. The line pressure at conduit 158 entering the mixing chamber 156 was 21 p.s.i.g., and the exhaust pressure at portal 166 of the laminar flow gun 144 was measured at 0.085 inch of water. Individual motor armatures each weighing approximately 208 grams were pre-heated to a temperature of 465° F., and 8.5 grams of dry powdered polyester resin coating material were applied to each armature via the two guns 130 in an 8.5 second coating cycle. A post cure heating of each armature at a temperature of 450° F. for ten minutes followed the coating operation. Testing of these coated armatures at 6000 volts with a "needle point" Hypot tester produced no evidence of breakdown of these insulating coatings.

Example II

Michigan Chrome standard run (mixed sizes) "650 Blue" epoxy powdered coating material was applied to a second series of the same 208-gram armatures. The armatures were pre-heated to a 435° F. coating temperature and the same pressures were used in the laminar flow projection guns 130. Between 10.0 and 10.5 grams of the powdered epoxy coating material was applied to each armature in a 6 second coating cycle, followed by a four minute post cure heating at 410° F. There was no evidence of breakdown or leakage current whatever at tests of the coated armatures with the Hypot tester at 3500 volts. Predetermined variations in the thickness of the coating applied in this test were produced by positioning and selecting the configuration of the projecting nozzles 131 shown in FIGURE 9. By this means a coating 137 (FIGURE 9) 0.052" thick extending axially ⅝ of an inch was applied to the shaft 135 at one side of the rotor 138 while a coating 0.088" thick was applied to the shaft on the opposite side of the rotor.

Example III

In tests performed by the Carborundum Company on its varistors such as the varistor 188 shown in FIGURES 15–17, one inch long by ¼" O.D. with an axial terminal wire 212 protruding at each end, Michigan Chrome "650 Blue" epoxy standard run, mixed particle-size powder was applied using the system shown in FIGURE 15 to produce perfect coatings on the cylindrical surface of the varistor and both of its end surfaces 210, leaving the terminal wires 212 entirely clear and uncoated beyond ⅛" from end surfaces 210.

*Alternative heating techniques.*—The coating systems shown in FIGURES 14 to 17 are well adapted for the use of radiation-heating techniques, to avoid excessive heating of the object to be coated. Delicate, miniature electronic components can thus be coated at unusually low temperatures.

For example, radiant energy such as visible light or infrared radiation may be directed by suitable means, such as mirrors, parabolic reflectors and focussing lenses, to be focussed as a source of highly concentrated heat on the advancing stream 189 of air-entrained powdered coating material between gun 186 and object 188 in the system of FIGURES 15 and 17. Such focussed radiation brings the advancing powder particles near or above their melting temperature, causing them to soften or melt and bond firmly to the surface of object 188 without appreciably heating this surface.

A subsequent, similar focussed radiation step may again raise the temperature of the coating material adhering to the surface of object 188 to fuse, glaze or smooth the coating's outer surface while the coating itself forms a thermal barrier protecting object 188 against damaging over-heating.

*Advantages.*—In all of the powder coating systems described, the laminar flow powder delivery produces striking advantages:

(1) Large quantities of powder are entrained and delivered in a small volume of advancing air. For example, in typical motor armature coating operations, an average rate of 300 grams of powder is delivered each minute by 1.12 cubic feet per minute of air, giving a powder to air weight ratio of 7.9 to 1.

(2) Powdered coating material is delivered in a smooth, slow-moving stream, with minimum eddying and turbulence, traveling at such low velocities as 960 feet per minute, for example, permitting optimum control of coating placement, thickness, uniformity and edge-delineation by guiding the arriving, passing and departing stream of coating material through balanced co-operation of the delivery guns, vacuum exhaust vents, vacuum shoes and such fresh air intake vents as the open top aperture of chamber 116 in FIGURE 8.

(3) Chilling of preheated objects to be coated is eliminated, since the slow-moving stream of powder and air has minimal chilling effects. Advance overheating of the workpiece is therefore unnecessary.

While the objects of the invention are efficiently achieved by the preferred forms of the invention described in the foregoing specification, the invention also includes changes and variations falling within and between the definitions of the following claims.

I claim:

1. Apparatus for projecting a flowing mixed stream of gas and fusible powdered coating material toward a heated object to be coated comprising in combination (A) means forming a mixing chamber having a gas feed passage and a powder feed passage opening therein along axes angularly displaced by an acute angle;

(B) means forming an elongated passageway having an input end opening into said chamber and an open output end facing toward the surface of the object to be coated;

(C) and a plurality of transverse flow straightening means spaced apart longitudinally along said passageway between said ends and anchored in fixed positions spanning said passageway;

(D) an exhaust hood in the vicinity of and beyond said object to be coated and positioned to receive excess coating material passing beyond said object without adhering thereto;

(E) and a powder return system connecting said exhaust hood with said powder feed passage and returning excess powder coating material to said powder feed passage.

2. The combination defined in claim 1 in which said flow-straightening means include transverse mesh screens spanning said passageway.

3. The apparatus defined in claim 1 including means for supporting the object to be coated and in which said open output end is positioned facing the surface of the object to be coated, and including heating means supplying heat to the surface of the object to be coated whereby said powdered material reaching said surface will fuse thereon to form a uniform coating.

4. The combination defined in claim 2 in which at least six transverse mesh screens are arrayed spanning the passageway
with apertures about ten times the average particle size of the powdered coating material, and with their apertures aligned along substantially smooth, uninflected streamlines.

References Cited by the Examiner

UNITED STATES PATENTS

| | | | |
|---|---|---|---|
| 1,826,776 | 10/1931 | Gunther | 239—432 X |
| 2,088,542 | 7/1937 | Westin | 118—301 X |
| 2,336,946 | 12/1943 | Marden et al. | 118—308 X |
| 2,419,835 | 4/1947 | Hester | 118—312 |
| 2,514,107 | 7/1950 | Trostler | 239—343 X |
| 2,688,563 | 9/1954 | Kieffer | 117—21 |
| 2,721,535 | 10/1955 | Zitkus | 118—301 |
| 2,770,212 | 11/1956 | Marantz | 118—312 X |
| 2,844,489 | 7/1958 | Gemmer | 117—21 |
| 2,946,697 | 7/1960 | Petro | 118—504 X |
| 2,953,483 | 9/1960 | Torok | 117—38 X |
| 3,014,451 | 12/1961 | Rhodes | 118—308 X |
| 3,016,875 | 1/1962 | Ballentine et al. | 117—21 X |
| 3,100,724 | 8/1963 | Rocheville | 118—308 |
| 3,185,131 | 5/1965 | Manning | 117—21 X |
| 3,247,004 | 4/1966 | Dosser | 117—18 |

FOREIGN PATENTS 1,137,732  1/1957  France.

OTHER REFERENCES

Gemmer, E.: Kuntstoffe, vol. 47, No. 8, pp. 510–512, August 1957, p. 512 relied upon.

CHARLES A. WILLMUTH, *Primary Examiner.*

RICHARD D. NEVIUS, *Examiner.*

J. P. McINTOSH, *Assistant Examiner.*